(12) United States Patent
Raux et al.

(10) Patent No.: US 11,221,689 B2
(45) Date of Patent: Jan. 11, 2022

(54) VOICE MODIFIED DRAWING

(71) Applicant: Lenovo (Singapore) Pte. Ltd., Singapore (SG)

(72) Inventors: Antoine Roland Raux, Cupertino, CA (US); Grigori Zaitsev, Durham, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 515 days.

(21) Appl. No.: 14/634,244

(22) Filed: Feb. 27, 2015

(65) Prior Publication Data
US 2016/0252973 A1    Sep. 1, 2016

(51) Int. Cl.
| | |
|---|---|
| *G06F 3/038* | (2013.01) |
| *G06F 3/0354* | (2013.01) |
| *G06F 3/0488* | (2013.01) |
| *G06F 3/16* | (2006.01) |

(52) U.S. Cl.
CPC .......... *G06F 3/038* (2013.01); *G06F 3/03545* (2013.01); *G06F 3/04883* (2013.01); *G06F 3/167* (2013.01)

(58) Field of Classification Search
CPC ...... G06F 3/033; G06F 3/0334; G06F 3/0338; G06F 3/046; G06F 3/03545; G06F 2003/04105
See application file for complete search history.

(56) References Cited

U.S. PATENT DOCUMENTS

| | | | | |
|---|---|---|---|---|
| 10,198,122 B2* | 2/2019 | Turgeman | ............ | G06F 3/0346 |
| 10,684,767 B2* | 6/2020 | Park | ...................... | G06F 3/0488 |
| 2006/0085767 A1* | 4/2006 | Hinckley | ............ | G06F 3/04842 |
| | | | | 715/863 |
| 2008/0211766 A1* | 9/2008 | Westerman | ............ | G06F 3/038 |
| | | | | 345/156 |
| 2011/0301943 A1* | 12/2011 | Patch | ...................... | G10L 15/26 |
| | | | | 704/9 |
| 2013/0155070 A1* | 6/2013 | Luo | ......................... | G06T 11/20 |
| | | | | 345/441 |
| 2014/0362024 A1* | 12/2014 | Hicks | ...................... | G06F 3/167 |
| | | | | 345/174 |
| 2015/0015504 A1* | 1/2015 | Lee | ..................... | G06F 3/04845 |
| | | | | 345/173 |
| 2015/0025883 A1* | 1/2015 | Koo | .......................... | G10L 15/22 |
| | | | | 704/235 |
| 2015/0062052 A1* | 3/2015 | Bernstein | ............. | G06F 3/0416 |
| | | | | 345/173 |
| 2015/0125829 A1* | 5/2015 | Hyman | ................... | B44C 3/046 |
| | | | | 434/81 |

OTHER PUBLICATIONS

Harada et al., "VoicePen: Augmenting Pen Input with Simultaneous Non-Linguistic Vocalization," Nov. 2007, ACM, International Conference on Multimodal Interfaces (IMCI)'07, pp. 178-185.*

* cited by examiner

*Primary Examiner* — William Lu
(74) *Attorney, Agent, or Firm* — Ference & Associates LLC

(57) ABSTRACT

One embodiment provides an information handling device, including: a processor; a memory device that stores instructions executable by the processor to: receive, at an electronic device, a drawing input; receive, at the electronic device, secondary user input; and modify, the drawing input based on the secondary user input; wherein the secondary input is voice input. Other aspects are described and claimed.

19 Claims, 4 Drawing Sheets

VOICE MODIFIED DRAWING

BACKGROUND

Information handling devices ("devices"), for example cell phones, smart phones, tablet devices, laptop computers, and the like permit users to input free hand input using a finger or pen/stylus. This allows users to digitally draw and sketch more naturally and without the use of an awkward mouse control system. This technology has also been adopted by artists and graphic designers for creating and designing artistic content.

Graphics tablets allow users (e.g., designers, artist, etc.) to draw and sketch in a manner similar to that of typical paper or sketch pad. In addition, it allows the designers to easily modify their works without the typical limitation of erasing on regular paper or painting over pre-existing work. The wide array of brush settings and drawing manipulation tools (e.g., zooming, shading, cloning, etc.) available in today's drafting software also allows uses greater control over their artistry and provides then with more options than would typically be available. Creating the work using a graphics tablet also enables the designer to manipulate previously created still images and transition them into animation. However, some limitations still exist when working with graphics tablets or the like.

BRIEF SUMMARY

In summary, one aspect provides a method, comprising: receiving, at an electronic device, a drawing input; receiving, at the electronic device, secondary user input; and modifying the drawing input based on the secondary user input; wherein the secondary user input is voice input.

Another aspect provides an information handling device, comprising: a processor; a memory device that stores instructions executable by the processor to: receive, at an electronic device, a drawing input; receive, at the electronic device, secondary user input; and modify, the drawing input based on the secondary user input; wherein the secondary input is voice input.

A further aspect provides a product, comprising: a storage device having code stored therewith, the code being executable by the processor and comprising: code that receives, at an electronic device, a drawing input; code that receives, at the electronic device, secondary user input; and code that modifies, the drawing input based on the secondary user input; wherein the secondary user input is voice input.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
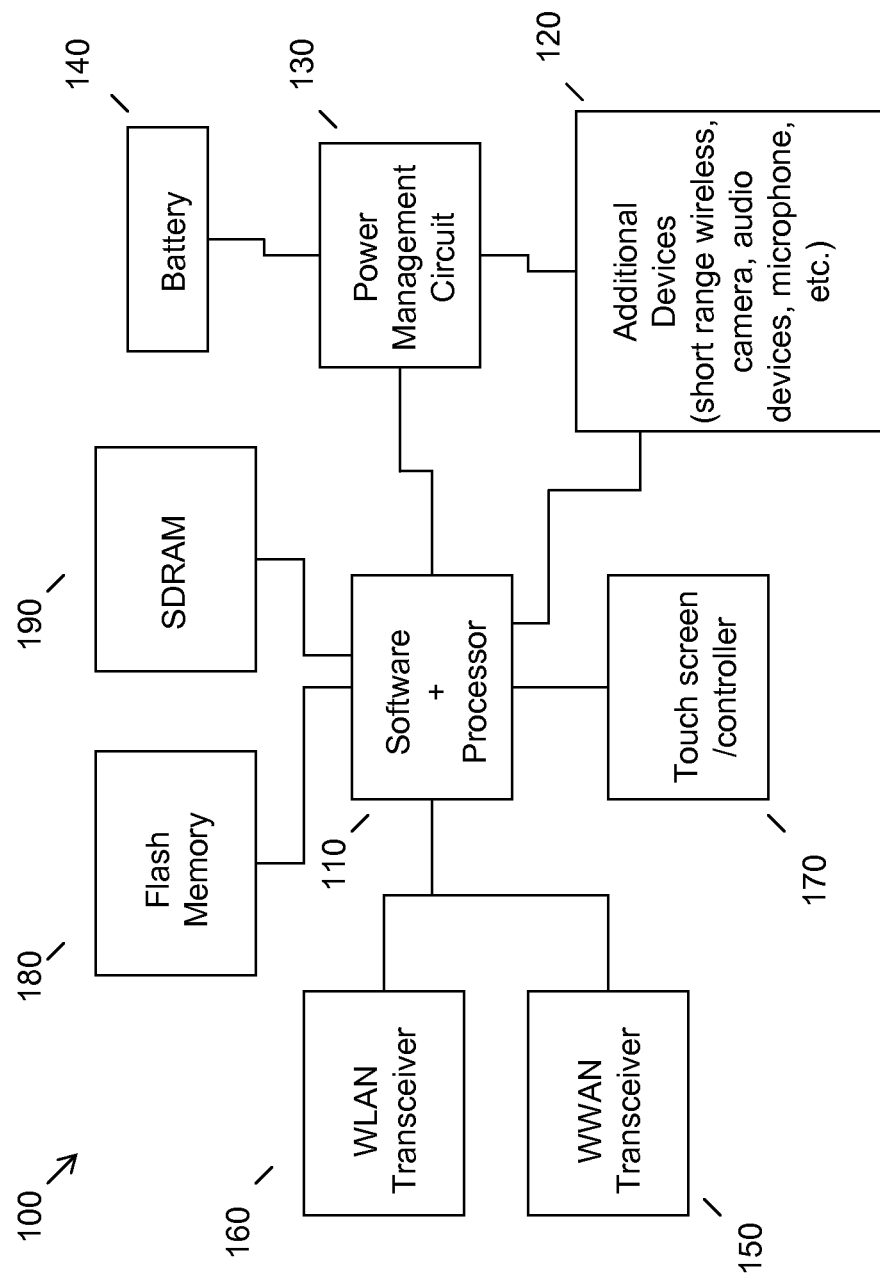
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Graphics tablets also known as digitizing tablets, graphic pads, or drawing tablets have become increasingly popular due to the numerous advantages they offer over the more traditional way of drawing and sketching (e.g., paper, cell, etc.). Typically, a graphics tablet comes with a pen or stylus. These styluses can come in a variety styles (e.g., a capacitive stylus, a resistive stylus, a surface acoustic wave stylus, an active digitizer stylus, etc.).

One of the major flaws of the drawing on a graphics tablet, is that when the user wishes alter the input in someway (e.g., color, brush size, brush style, etc.) they must cease their drawing and use either their stylus or another mode of input to make changes or select a different input method. With the plethora of options available in today's graphic design software it can take a user a considerable amount of time to make menu selections. Not only does this slow down the user, but it also forces them to stop the fluid drawing motion and in many instances remove the stylus from the surface of the tablet. Once the stylus is removed from the drawing path, it can be difficult to ensure a smooth continuation of the current line or shape. This flaw makes it extremely difficult to modify the properties of a selected stylus tool while also tracing a continuous curve or trajectory.

Currently, a user would have to separately draw all the different segments of the curve or trajectory, modifying the settings between each subsequent drawing. Additionally or alternatively, the user could draw the full curve or trajectory then edit it along the path by modifying the settings at different points. Neither of these two approaches allows for fast and natural sketching of drawings, animations, or complex designs.

The technical issue presents problems for a user in that currently, the user is constantly interrupted and thus the drawings or sketches look compartmentalized or broken up. The lack of flow is apparent not only from the change in properties desired by the use, but it is emphasized by the non-continuous appearance of the drawing. A solution is needed that allows for a user to have a continuous and uninterrupted drawing session while simultaneously granting the ability to alter the properties of the input tool. This technical improvement would not only increase the efficiency of the user, but it would also increase the quality of the product produced by the user.

Accordingly, an embodiment provides a method of receiving a stylus input on a graphical tablet, and rendering that input into a visual depiction of the user's drawing. A secondary user input (e.g., a voice command, gaze tracking command, etc.) is then received that directs a drawing application to alter the properties of the input tool without interrupting the continuous curve or trajectory of the stylus input. For example, an embodiment may allow the user to draw a continuous curve in green ink, and when the user desired a property change, they would speak the term "red" and the input tool switches the selected ink properties to red. This processes of altering the input properties is done without lifting the drawing tool (e.g., pen, mouse, stylus, etc.) thus allowing for a continuous curve that has different properties (e.g., color, thickness, shape, texture, diameter, scattering, opacity, flow, hardness, angle, etc.) at different points.

Additionally, if a user desires to change the stylus settings at precise points along the curve, an embodiment may allow for the user to stop their motion at the desired point, without lifting the drawing device, and enter the secondary input. Once the secondary input was recognized and the property setting updated, the user can resume their drawing motion. In an additional embodiment, a user can speak a voice command before the stylus reaches the user's desired point of change, and upon reaching the desired point, the user can utilize an alternative input mechanism to specify the exact point for the change to occur. For example, if a user were using a stylus, they could apply additional pressure (e.g., pressing the stylus against the input surface, exceeding some predetermined threshold) on the pen at the exact point where the change is desired. Alternatively, if the user were using a mouse, a secondary button could be used (typically, the primary button is already being utilized as an indicator that the drawing tool is down/active).

In a further embodiment, a user may wish to create composite animations, such as those in a movie or television production application. By way of example, the user could draw a trajectory of a character while issuing specific voice commands that trigger preset character behaviors (e.g., jump, crouch, wave, etc.) at the specific time and place the user desires them to take place. With minimal training, this approach allows users to quickly draw sketches of their desired shapes and animations smoothly and efficiently.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an image sensor such as a camera. System 100 often includes a touch screen 170 for data input (e.g., receiving input from a finger, a stylus, etc.) and display/rendering. System 100 also typically includes various memory devices, for example flash memory 180 and SDRAM 190.

Figure 2:
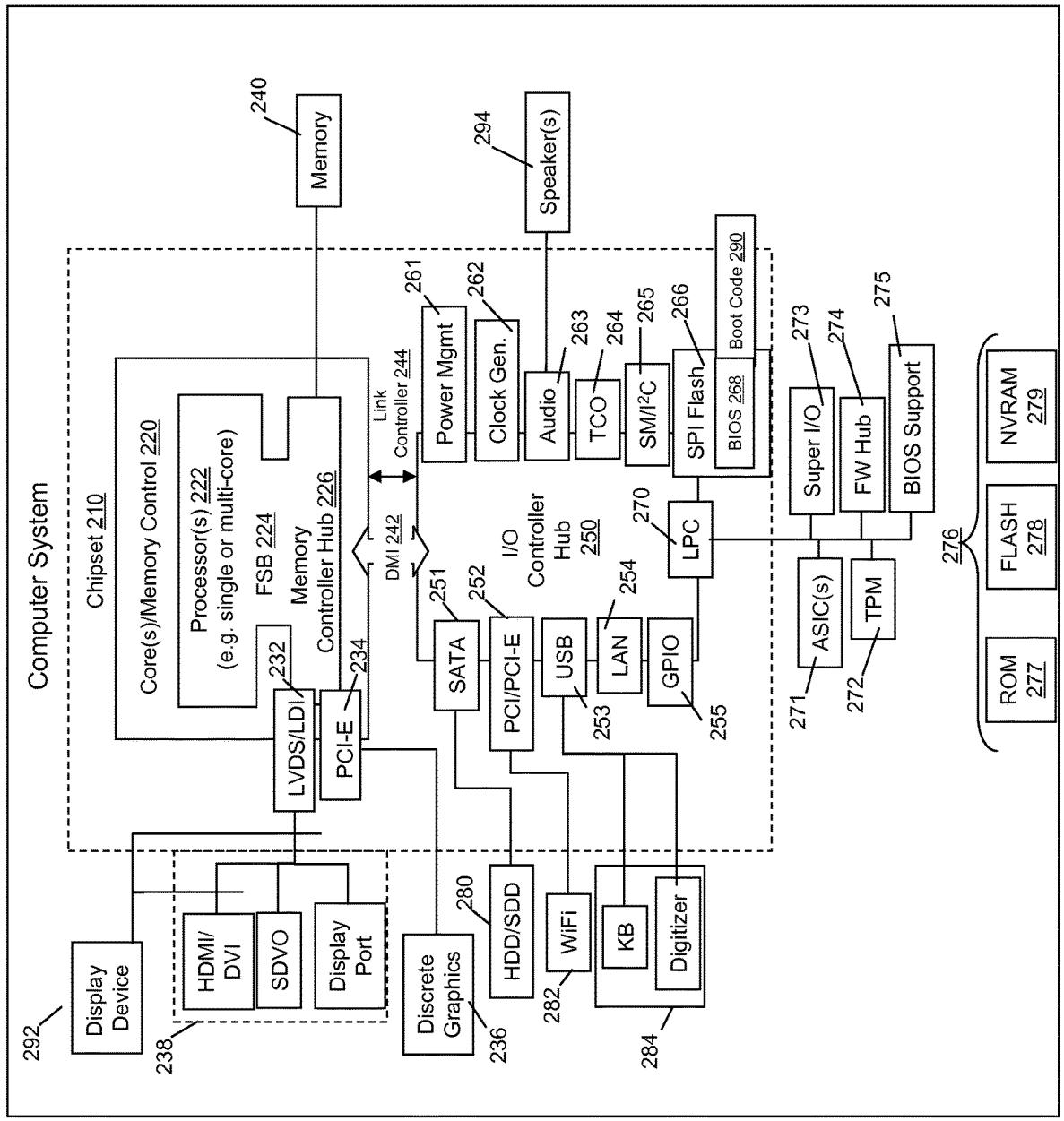
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as tablets, smart phones, personal computer devices generally, and/or electronic devices which users may employ for various functions (e.g., inputting sketches or drawings of artistic creations, selecting and manipulating created objects, and enhancing characters or images with animations). For example, the circuitry outlined in FIG. 1 may be implemented in a tablet or smart phone embodiment, whereas the circuitry outlined in FIG. 2 may be implemented in a personal computer embodiment. In each case, the device may include an input and display device (e.g., a touch screen or the like), which acts to accept stylus input and provides visual displays of free hand drawing or sketches, as well as components to modify properties of previously created objects.

Figure 3:
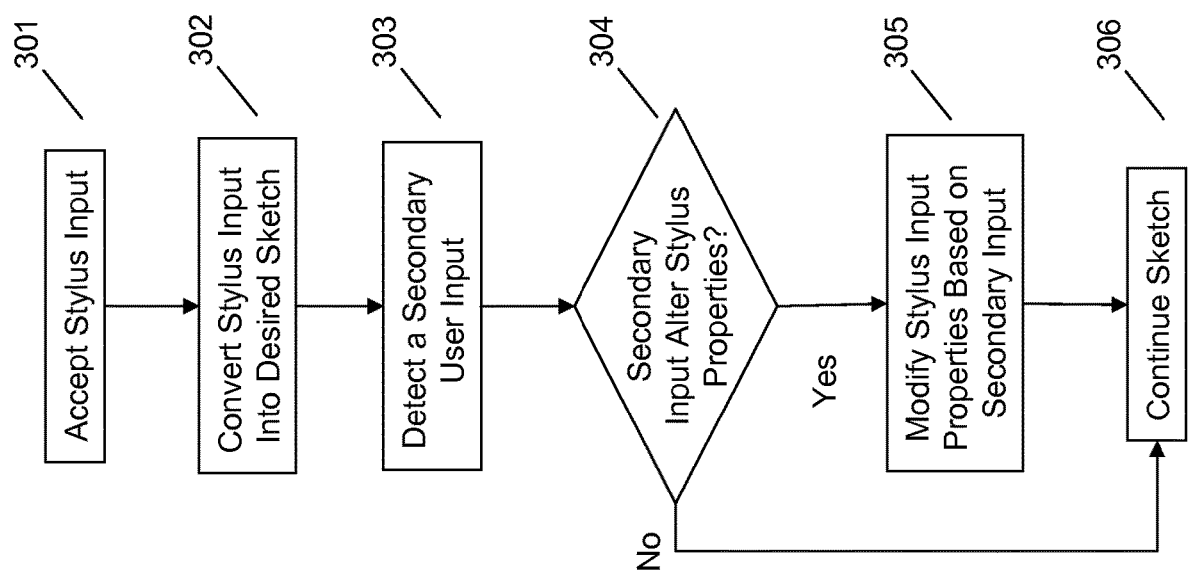
FIG. 3 illustrates an example method of modifying a stylus input based on a secondary user input.

Referring now to FIG. 3, an embodiment receives stylus input 301. The stylus input may be received on a touch device 301 (e.g., smart phone, tablet, graphical design tablet, or the like). Although many touch devices are also display devices, an embodiment may use a touch input only device (e.g., an INTUOS pen and touch medium) in combination with a display device (e.g., a computer monitor, etc.). INTUOS is a registered trademark of Wacom Co., Ltd. in the United States of America and other countries. A processing engine or system, (e.g., a drawing application such as PHOTOSHOP and SKETCHBOOK) then renders the stylus input into a visual depiction of the user's drawing 302. PHOTOSHOP is a registered trademark of Adobe Systems, Inc. in the United States of America and other countries. SKETCHBOOK is a registered trademark of Autodesk, Inc. in the United States of American and other countries. For example, if a stylus is used to paint strokes to a touch screen display device, the coordinates of the strokes are analyzed and reproduced to the user visually.

In a further embodiment, an additional input (e.g., a secondary input) is received from the user 303. This additional input can be received on the same touch surface as the stylus input 301, or be received through an alternative input. For example, the user's voice may be received by an audio input device (e.g., the microphone on a tablet or smartphone device). The secondary input, 303 can be received through a variety of methods (e.g., keyboard, gaze tracking, user movement, device movement, mouse, foot pedal, etc.) and is not limited to voice input. However, for simplicity purposes, the following embodiments and examples will focus on using the user's voice as the secondary input. Additionally, voice commands have the ability to grant a user an extremely wide range of input commands whereas other forms of input are finite in their options of input.

The types of properties that can be altered through the use of secondary input 303 (e.g., voice commands) are unlimited and bound only by the sketching/animation software the user is employing. For example, a user can select different types of brush or pen tools using voice commands (e.g., "set thickness 3", "color blue", etc.). In addition to drawing and sketching, users may wish to alter existing or previously created objects through the secondary input (e.g., orientation, rotation, color, size, shape, filter, opacity, etc.). For example, in an embodiment, a user may select a previously created square object and manipulate its properties through the secondary input 303 (e.g., "rotate 90 degrees", "set opacity 50%", etc.).

Additionally or alternatively, an embodiment may allow a user to go even further and use the secondary input to animate their creations. By way of example, a user could again select a square object with the stylus and using the stylus set a trajectory for the object (e.g., a line, an arc, a circle, etc.) while at the same time using the voice controlled secondary input to rotate the square object as it follows the desired trajectory. Thus allowing a user to set two forms of animation simultaneously. In an additional embodiment, a user may wish to create composite animations (e.g., for a movie or television production). For example, a user can draw a trajectory of a character while issuing voice commands to trigger a preset character behavior (e.g., "jump", "crouch", "walk", "run", etc.) at the specific time and place the user wishes the behavior to take place.

Once the additional or secondary input is detected 303, a determination must be made as to whether the secondary input is relevant and intended by the user to alter the stylus input properties 304. Using voice recognition, an embodiment, could ensure that only commands spoken by a particular user are utilized in altering the stylus input properties. Additionally or alternatively, an embodiment could use a trigger phrase (e.g., beginning each phrase with "tablet change" or the like) to indicate that the voice command was to be understood as the secondary input. In an additional embodiment, all spoken language within the vicinity of the graphics tablet could be used as secondary input. Once the determination is made that the secondary input is intended to alter the stylus input 304, the application modifies the stylus input properties as desired by the user 305 and indicated by the secondary input.

In an embodiment, determination 304 and the modification of the stylus input 305 happen almost instantly in order to avoid a mishap when the user continues their brush stroke causing unwanted edits to the creation 306. However, in an embodiment, it may be required that the user stop momentarily during the continuous stylus input, to allow the desired secondary command (e.g., voice command) to take effect and then continue the stylus input. Thereby allowing the stylus input properties to be wholly altered precisely as the user desired before continuing the drawing and causing undesired results. Although a pause may be required, the removal of the stylus from the tablet would not, thus still ensuring a steady and continuous stroke or line as the user intended.

Figure 4:
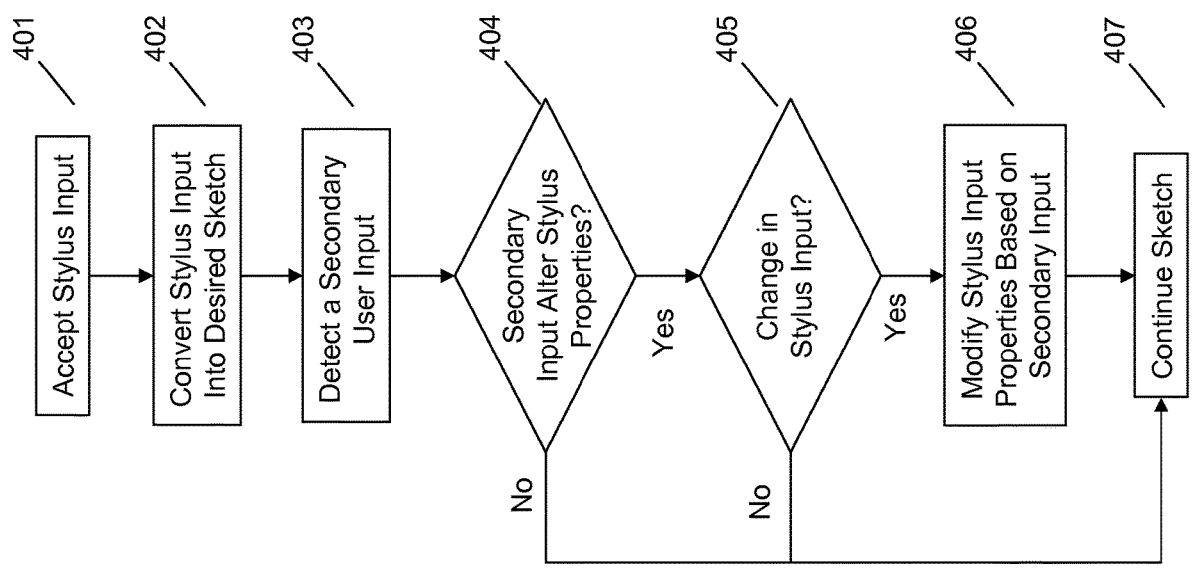
FIG. 4 illustrates another example method of modifying a stylus input based on a secondary user input and a stylus input.

Referring now to FIG. 4, an embodiment receives stylus input 401. Similar to FIG. 3, the stylus input may be received on a touch device 401 (e.g., smart phone, tablet, graphical design tablet, or the like). Although many touch devices are also display devices, an embodiment may use a touch input only device (e.g., an INTUOS pen and touch medium) in combination with a display device (e.g., a computer monitor, etc.). INTUOS is a registered trademark of Wacom Co., Ltd. in the United States of American and other countries. A processing engine or system, (e.g., a drawing application such as PHOTOSHOP and SKETCHBOOK) then renders the stylus input into a visual depiction of the user's drawing. 402 PHOTOSHOP is a registered trademark of Adobe Systems, Inc. in the United States of America and other countries. SKETCHBOOK is a registered trademark of Autodesk, Inc. in the United States of American and other countries. For example, if a stylus is used to paint strokes to a touch screen display device, the coordinates of the strokes are analyzed and reproduced to the user visually.

In a further embodiment, an additional input (e.g., a secondary input) is received from the user 403. This additional input can be received at on the same touch surface as the stylus input 401, or be received through an alternative input. For example, the user's voice may be received by an audio input device (e.g., the microphone on a tablet or smartphone device). The secondary input, 403 can be received through a variety of methods (e.g., keyboard, gaze tracking, user movement, device movement, mouse, foot pedal, etc.) and is not limited to voice input. However, for simplicity purposes, the following embodiments and examples will focus on using the user's voice. Additionally, voice commands have the ability to grant a user an extremely wide range of input commands whereas other forms of input are finite in their options of input.

The types of properties that can be altered through the use of secondary input 403 (e.g., voice commands) are unlimited and bound only by the sketching/animation software the user is employing. For example, a user can select different types of brush or pen tools using voice commands (e.g., "set thickness 3.0", "color blue", etc.). In addition to drawing and sketching, users may wish to alter existing or previously created objects through the secondary input. For example, in an embodiment, a user may select a previously created square object and manipulate its properties through the secondary input 403 (e.g., "rotate 90 degrees", "set opacity 50%", etc.).

Additionally or alternatively, an embodiment may allow a user to go even further and use the secondary input to animate their creations. By way of example, a user could again select a square object with the stylus and using the stylus set a trajectory for the object (e.g., a line, an arc, a circle, etc.) while at the same time using the voice controlled secondary input to rotate the square object as it follows the desired trajectory. Thus allowing a user to set two forms of animation simultaneously. In an additional embodiment, a user may wish to create composite animations (e.g., for a movie or television production). For example, a user can draw a trajectory of a character while issuing voice commands to trigger a preset character behavior (e.g., "jump", "crouch", "walk", "run", etc.) at the specific time and place the user wishes for the behavior to take place.

Once the additional or secondary input is detected 303, a determination must be made as to whether the secondary input is relevant and intended by the user to alter the stylus input properties 404. Using voice recognition, an embodiment could ensure that only commands spoken by a particular user are utilized in altering the stylus input properties. Additionally or alternatively, an embodiment could use a trigger phrase (e.g., beginning each phrase with "tablet change" or the like) to indicate that the voice command was to be understood as the secondary input. In an additional embodiment, all spoken language within the vicinity of the graphics tablet could be used as secondary input. Once the determination is made that the secondary input is intended to alter the stylus input 304, the application modifies the stylus input properties as desired by the user 305 and indicated by the secondary input.

When the user inputs the secondary input 403, there could be a small delay between when they speak the command and when the software implements the command. Additionally, the user may not account for the length of time required to speak or enter the command. This small time delay can cause issues when a user is attempting to draw in a continuous manner a while also altering the stylus input properties. Therefore, in an additional embodiment, in order to ensure that the user gets their desired results, an additional failsafe included. Such a failsafe would take the shape of decision based on an additional user input (e.g., a change to the stylus input, etc.) 405 that is required after the processing of the secondary input 403.

For example, in an embodiment, if a user were drawing a curved line they could input the voice command 403 (e.g., "color blue"); however the stylus input properties would remain consistent until an additional user input (e.g., a change in writing pressure, a change in writing direction, and a change in writing speed) was detected to trigger the secondary input, in this case changing the color to blue. This additional input would signal more precisely the user's intent to change the properties at that exact point. By allowing this command to be issued from the stylus input 405, the user is given more precise control over where the change takes place, because it is triggered by the same input method that is also doing the sketching. This limits the possibility for user error or problems cause by software lag.

Once the determination 404 and 405 both take place, the modification of the stylus input 406 takes place and allows the user's continuation of their brush stroke without causing unwanted edits to their creation when they continue their sketch 407. This additional required stylus input removes the need for the user to stop momentarily during the continuous stylus input, after giving the desired secondary command (e.g., voice command).

Accordingly, as illustrated by the example embodiments and figures, an embodiment provides a method of receiving a secondary user input that alters the properties of the stylus input tool while a user is drawing or creating an animation trajectory. This allows for modification of the stylus input without requiring the lifting of the drawing tool, and thus allows for a continuous user input having different properties (e.g., color, pressure, thickness, brush style, etc.) at various points.

The various embodiments described herein thus represent a technical improvement to the process of graphic design and animation. During the drafting process, a typical user will need to change tool settings at precise points without stopping their desired motion. The addition of voice control greatly expands the functionality of a graphic design tablet. Moreover, the ability to precisely decide based on stylus input when the change in properties takes place using multiple determinations ensures that the user gets their desired outcome consistently. This not only increasing a user's enjoyment, but also their accuracy and efficiency in utilizing a technical device such as a graphical tablet.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
    receiving, at an electronic device, a drawing input comprising a continuous stroke;
    receiving, at the electronic device, secondary user input, wherein the secondary user input is associated with a modification to the drawing input;
    receiving, at a time after the secondary user input, but still during the continuous stroke, a tertiary input; and
    modifying, responsive to receiving the tertiary input, the drawing input based on the secondary user input, wherein the modification is applied while receiving the continuous stroke;
    wherein the secondary user input is voice input;
    wherein the tertiary input is a different input type than the drawing input and the secondary user input.

2. The method of claim 1, wherein the receiving a drawing input further comprises detecting one or more of: stylus pressure, stylus speed, and stylus direction that exceeds a predetermined threshold; and
    wherein the modifying the drawing input occurs in response to the detecting.

3. The method of claim 1, wherein the receiving a drawing input comprises accepting a drawing input entered using a device selected from the group consisting of: a mouse, a finger, a pen, a capacitive stylus, a resistive stylus, a surface acoustic wave stylus, and an active digitizer pen.

4. The method of claim 1, wherein the modifying comprises changing a character of the drawing input.

5. The method of claim 4, wherein the character is one or more of: color, thickness, shape, texture, diameter, scattering, opacity, flow, hardness, and angle.

6. The method of claim 1, wherein the modifying comprises changing a character of an object, wherein the character is one or more of: orientation, rotation, color, size, shape, filter, and opacity.

7. The method of claim 1, further comprising interpreting the drawing input as an animation trajectory.

8. The method of claim 7, wherein the modifying comprises modifying at least one preset animation along the animation trajectory.

9. The method of claim 1, wherein the modification is applied not while the drawing input is received.

10. An information handling device, comprising:
    a processor;
    a memory device that stores instructions executable by the processor to:
    receive, at an electronic device, a drawing input comprising a continuous stroke;
    receive, at the electronic device, secondary user input, wherein the secondary user input is associated with a modification to the drawing input;

receive, at a time after the secondary user input, but still during the continuous stroke, a tertiary input; and modify, responsive to receiving the tertiary input, the drawing input based on the secondary user input, wherein the modification is applied while receiving the continuous stroke;

wherein the secondary input is voice input wherein the tertiary input is a different input type than the drawing input and the secondary user input.

11. The information handling device of claim 10, wherein the receiving a drawing input further comprises detecting one or more of: stylus pressure, stylus speed, and stylus direction that exceeds a predetermined threshold; and wherein the modifying the drawing input occurs in response to the detecting.

12. The information handling device of claim 10, wherein the receiving a drawing input comprises accepting a drawing input entered using a device selected from the group consisting of: a mouse, a finger, a pen, a capacitive stylus, a resistive stylus, a surface acoustic wave stylus, and an active digitizer pen.

13. The information handling device of claim 10, wherein the modifying comprises changing a character of the drawing input, wherein the character is one or more of: color, thickness, shape, texture, diameter, scattering, opacity, flow, hardness, and angle.

14. The information handling device of claim 10, wherein the modifying comprises changing a character of an object, wherein the character is one or more of: orientation, rotation, color, size, shape, filter, and opacity.

15. The information handling device of claim 10, further comprising interpreting the drawing input as an animation trajectory.

16. The information handling device of claim 15, wherein the modifying comprises modifying at least one preset animation along the animation trajectory.

17. The information handling device of claim 10, wherein the modification is applied not while the drawing input is received.

18. A product, comprising:

a storage device having code stored therewith, the code being executable by the processor and comprising:

code that receives, at an electronic device, a drawing input comprising a continuous stroke;

code that receives, at the electronic device, secondary user input, wherein the secondary user input is associated with a modification to the drawing input;

code that receives, at a time after the secondary user input, but still during the continuous stroke, a tertiary input; and code that modifies, responsive to receiving the tertiary input, the drawing input based on the secondary user input, wherein the modification is applied while receiving the continuous stroke;

wherein the secondary user input is voice input wherein the tertiary input is a different input type than the drawing input and the secondary user input.

19. A method, comprising:

receiving, at an electronic device, a drawing input;

receiving, at the electronic device, secondary user input, wherein the secondary user input is associated with a modification to the drawing input;

receiving, at a time after the secondary user input, but still during the continuous stroke, a tertiary input; and modifying, responsive to receiving the tertiary input, the drawing input based on the secondary user input, wherein the modification is applied prior to completion of a drawing operation of the drawing input;

wherein the secondary user input is voice input wherein the tertiary input is a different input type than the drawing input and the secondary user input.

\* \* \* \* \*